United States Patent [19]

Yoshimaru et al.

[11] Patent Number: 5,058,089
[45] Date of Patent: Oct. 15, 1991

[54] MEMORY DISK AND APPARATUS FOR RECORDING INFORMATION ON MEMORY DISK

[75] Inventors: Tomohisa Yoshimaru; Tsuneshi Yokota, both of Kanagawa; Hideo Kumagai, Tokyo, all of Japan

[73] Assignee: Kabushiki Kaisha Toshiba, Kanagawa, Japan

[21] Appl. No.: 486,847

[22] Filed: Mar. 1, 1990

[30] Foreign Application Priority Data

Mar. 1, 1989 [JP] Japan .................................. 1-49419

[51] Int. Cl.$^5$ .............................................. G11B 7/00
[52] U.S. Cl. ...................................... 369/32; 369/58; 369/53; 369/54; 369/47
[58] Field of Search .................. 369/32, 58, 53, 54, 369/124, 111, 50, 47, 48; 360/75; 371/38

[56] References Cited

U.S. PATENT DOCUMENTS

| | | | |
|---|---|---|---|
| 4,532,621 | 7/1985 | Nakagawa | 369/111 |
| 4,558,375 | 12/1985 | Sontheimer | 369/50 |
| 4,761,772 | 8/1988 | Murakami | 369/32 |
| 4,835,757 | 5/1989 | Abiko | 369/54 |

*Primary Examiner*—Roy N. Envall, Jr.
*Assistant Examiner*—Thang V. Tran
*Attorney, Agent, or Firm*—Banner, Birch, McKie & Beckett

[57] ABSTRACT

An optical disc device includes an optical head for recording/reproducing information to and from an optical disc. The optical disc has two primary recording areas. On a first recording area of the two primary areas, the optical head records information so that the linear density of information is maintained constant. On a second recording area of the two primary areas, the optical head records information so that the spacing between adjacently recorded information increases with increasing radial position of the head or the recording position is further removed from the center of the optical disc. A substitute area is allocated such that the optical head records information in this substitute area when a defective memory portion portion is detected in the first and/or the second recording area during production or recording.

22 Claims, 11 Drawing Sheets

MEMORY DISK AND APPARATUS FOR RECORDING INFORMATION ON MEMORY DISK

CROSS-REFERENCE TO RELATED APPLICATIONS

This application is related by subject matter to the following patent applications of the same inventors and bearing the same title filed concurrently herewith: Ser. No. 486,830 and Ser. No. 486,925.

BACKGROUND OF THE INVENTION

1. Field of the Invention

The present invention generally relates to the field of optical memories and apparatus for recording and reading an optical memory, and more particularly to an optical memory and apparatus capable of recording and reading data quickly and in a more stable manner.

2. Description of the Related Art

Optical memories having a layer or film of semiconductor materials are widely used in industrial and consumer recording systems such as video recorders, digital audio recorders, and document digital recorders. A signal is recorded on the optical disc by irradiation with a laser beam to form bits of information in the layer of semiconductor materials. The optical disc permits direct reading after the information has been written or recorded and random access to the information. Optical discs may also be used for erasable recording.

There are several different techniques by which information may be recorded using optical discs. These techniques include heat application (i.e., ablation or other means of changing disc topography), chemical reaction, particle coalescence, phase change, and magnetization change. For the first four techniques, the optical contrast is obtained by the difference in reflectivity between the recorded and unrecorded states. In magnetization change, the contrast is obtained from the change in the direction of the polarization of light due to the change in the polarity of magnetization in a recorded area.

These techniques are known in the art and will not be discussed in detail here. Briefly, ablation utilizes laser light to selectively melt the recording medium. The surface tension of the molten liquid pulls the film away from the center, resulting in the formation of a hole or pit. Optical media on which data is recorded by a topography change include bubble forming media. A bubble is formed due to either gas evolution from the underlying polymer or microswelling of the metal or polymer layer upon laser irradiation. In chemical reaction recording, a laser-induced chemical reaction is initiated between two initially discrete layers. In particle coalescence, a very thin and discontinuous metal film is subjected to laser irradiation to induce a coalescence of metal particles. In phase changes, the optical properties of the recording medium are changed by inducing phase changes therein. Depending on the laser characteristics, the recording medium exhibits two different reflectances and the change between the two states may be reversible. The reversible change may, for example, be an amorphous to crystalline phase transition. In magnetization, the area irradiated with the laser exhibits a changed direction of magnetization. A linearly polarized laser light of low intensity is used to sense the change in magnetic direction.

So-called image filing systems are widely used as business machines for recording and reproducing document data. As is known in the design of such systems, image data is first optically read off a document, and then the read out image data is recorded into a recording medium. The image data recorded onto the optical memory may be read therefrom and subsequently reproduced on a display unit for visual presentation or supplied to a printer for printing a hard copy.

Optical disc recording devices used in these known image filing systems employ optical discs for recording image data. Image data is recorded in spiral tracks on the surface of the optical disc. For recording or reading out the image data, an optical head, set close to the optical disc, is driven by a linear motor to rectilinearly move in the radial direction of the optical disc.

Two methods are conventionally used for recording or reading the image data; one is a so-called constant linear velocity (CLV method), and the other is a so-called constant angular velocity (CAV method). In the CLV method, a track on the optical disc moves at a constant linear velocity relative to the optical head which has been moved to a particular radial location on the disc. Consequently, the optical disc is rotated at a decreasing angular velocity as the optical head is moved to a recording location further removed from the center of the disc; that is, angular velocity of the disc is caused to decrease with increasing radius or radial position of the optical head. In the CLV method, for recording and reading out image data, the rotating speed of the optical disc changes as the position of the optical head changes in its radial path above the optical disc in order to maintain linear velocity constant with increasing radius. The CLV method ensures that all tracks of the disc move at a constant speed relative to the optical head. However, it takes a long time for the angular velocity to settle to a constant value in each access at different radial positions of the head. Thus, the CLV method requires a long access time and exhibits a slow data transfer rate.

In the CAV method, the rotating speed of the optical disc is set at a constant value for stabilizing the record/read out operation and reducing an access time. However, since the angular velocity of the optical disc is constant, image data becomes less dense with increasing radius. Thus, the CAV method does not lend itself to the production of high density optical discs.

Some improvements are proposed for the CLV method. One is a method where the rotating speed is set at a constant value. The frequency of a clock used in the system is varied in accordance with the head position for recording and reading data so that the data are formed on the disc at a predetermined constant spacing therebetween along the tracks. Hereinafter, this method will be referred to as a constant linear density method (CLD method).

In the CLD method, the frequency of the clock increases as the optical head moves from the inside to the outside of the optical disc. It is difficult, however, to control the high frequency of the clock at the outside of the disc.

On the other hand, the optical disc is apt to have defect portions caused during data storage and retrieval or during manufacture. One known technique for detecting defect portions on an optical disc during storage and retrieval from the disc is disclosed by U.S. Pat. No. 4,835,757 incorporated herein by reference. It is not economical to throw away optical discs found to contain a small percentage of defective recording area.

SUMMARY OF THE INVENTION

Accordingly, an object of the present invention is to provide an optical memory device which can record more data and access the recorded data more quickly.

It is another object of the present invention to provide an optical memory device which can record data stably on the entire of an optical memory, i.e., to minimize wasted portions or the necessity of discarding discs with only a small percentage of defective recording area.

In accordance with the present invention, the foregoing objects, among others, are achieved by providing an optical memory device for recording information to an optical memory which records information in response to light irradiated thereon comprising motor means for rotating the optical memory at a constant speed. Head means records information on the optical memory having three areas thereon. On a first recording area of the three areas, the head means records information at a predetermined constant spacing. On a second recording area of the three areas outside the first area, the head means records information such that the spacing between adjacently recorded information increases as the position at which the head means records information is further removed from the center of the optical memory. On a substitute or third area of the three areas, the head means records information when a defect portion is detected in the first or the second recording area. This third area may be defined within the boundaries of either the first or second recording area or may be allocated just outside the boundaries of either the first or second area.

BRIEF DESCRIPTION OF THE DRAWINGS

Other objects and many of the attendant advantages of this invention will be readily appreciated as the invention becomes better understood by reference to the following detailed description when considered in connection with the accompanying drawings, in which like reference characters designate the same or similar parts throughout the figures thereof and wherein.

DETAILED DESCRIPTION OF THE PREFERRED EMBODIMENT

Figure 1:
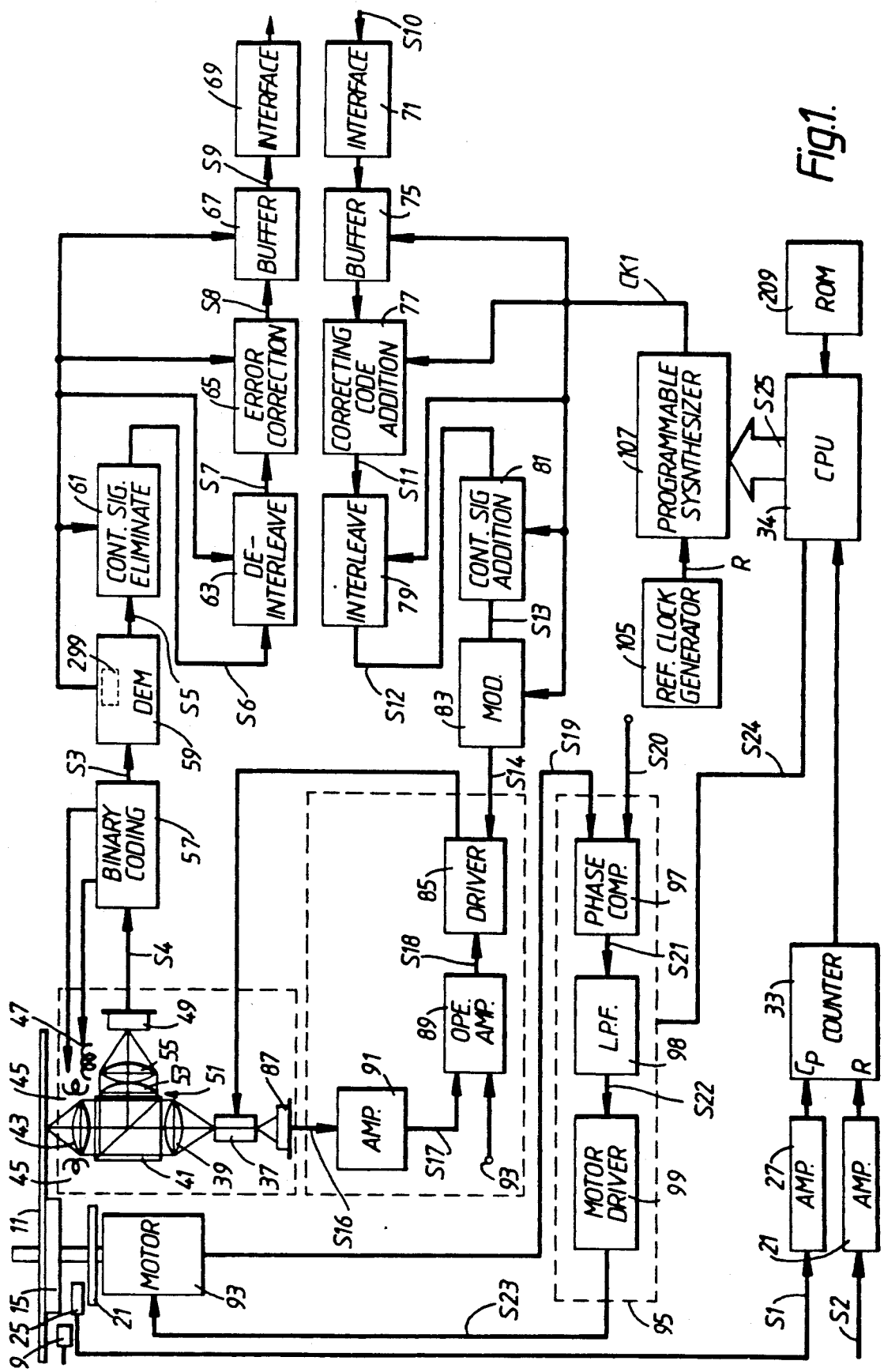
FIG. 1 is a circuit diagram of an optical disc recording or reproducing device according to the present invention.
Figure 2:
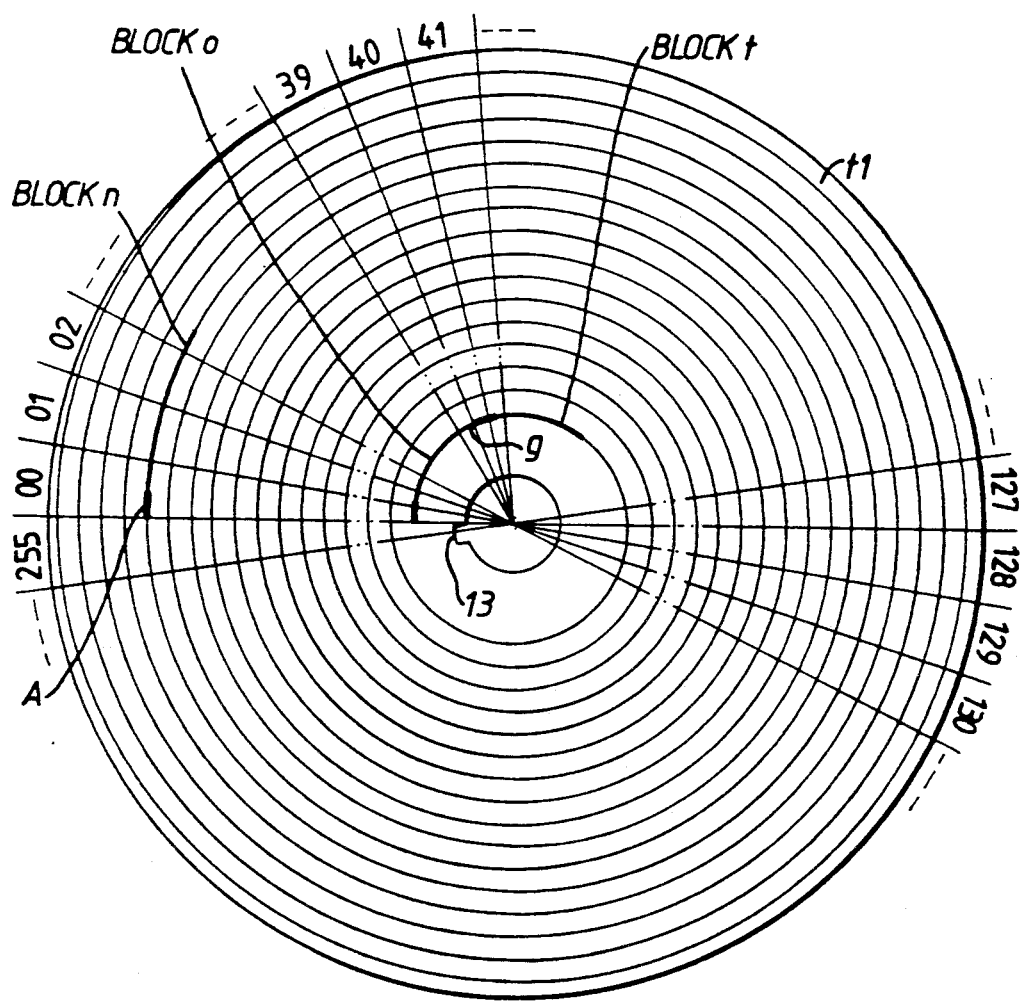
FIG. 2 is a plan view of an optical disc used in the optical disc recording device shown in FIG. 1.

Referring now to FIG. 1, an optical disc recording device (which may either record or read) uses an optical disc 11 as a recording medium. Optical disc 11 (as shown in FIG. 2) comprises a disc plate made of glass or plastic and a metal film of tellurium bismuth, for example, with which the surface of the disc plate is coated in layers. Optical disc 11 has a cutaway reference position mark 13 formed near the center of the metal film. Although the disclosed embodiment includes a recording layer of a tellurium bismuth alloy in which information is recorded by the formation of pits, it will be apparent to those skilled in the art that the invention is not limited in this respect. As discussed above, various types of optical memories are known and the teachings of the present invention may be utilized for different types of optical memories.

The surface of optical disc 11 is divided into a plurality of sectors, for example, 256 sectors, numbered 0 to 255. These sectors are consecutively numbered clockwise on optical disc 11, with the number 0 for reference position mark 13. A helical groove is formed on a recording area on optical disc 11 from the inside to the outside of the disc. The helical groove is segmented into a plurality of tracks, for example, 36,000 tracks, each track being one turn of the groove on optical disc 11. These 36,000 tracks are successively numbered from 0 to 35,999.

These 36,000 tracks are segmented into, for example, 300,000 blocks. Each block has a plurality of sectors. In each block, the number of sectors of a track on the inside of the disc is different from that of an outside track. If one track fails to exactly terminate at the boundary between respective sectors for a given amount of information or data, a block gap g is provided between the data end of one sector and the beginning of data of the next sector. For example, the block 0 terminates preceding to sector 41 of block 1 and thus, a block gap g is provided in the final sector 40 of the block 0. Thus, each block of optical disc 11 starts at the beginning of a sector. A block header including a block number, a track number, and the like is recorded in the header portion of each block for identification of the block. The block header A is recorded, for example, when data is recorded into optical disc 11.

Figure 3:
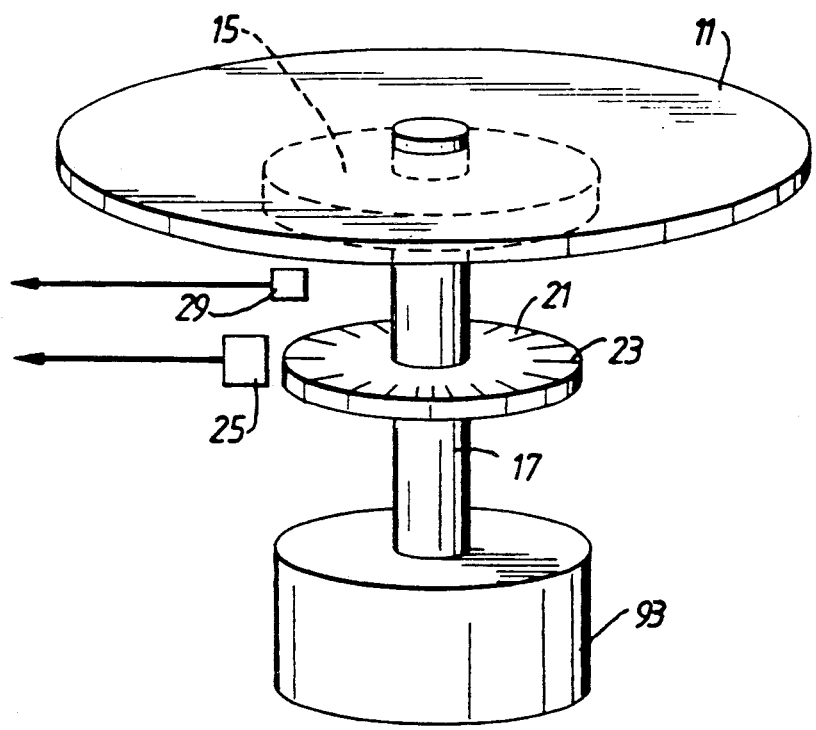
FIG. 3 is a perspective view of an optical disc drive mechanism used in the optical disc recording device shown in FIG. 1.

Referring now to FIG. 3, optical disc 11 is set on a turn table 15 which is coupled to a shaft 17 of a motor 19. A clock disc 21 is also mounted to shaft 17. Sector markers 23 are marked on the outer periphery portion of clock disc 21 at constant intervals, corresponding to the sectors (No. 0 to No. 255) on optical disc 11. Specifically, sector markers 23 are provided closer to the outer peripheral edge of clock disc 21, and optically or otherwise detected by a sector marker detector 25 conveniently constructed with a photo interrupter or other device known in the art. The sector marker detector 25 is connected to an input terminal of an amplifier 27 as shown in FIG. 1.

A reference mark detector 29 for detecting reference position mark 13 of optical disc 11 is located under optical disc 11. Reference mark detector 29 may also conveniently be constructed with a photo interrupter, like sector marker detector 25. An output terminal of reference mark detector 29 is connected to an amplifier 31. Output terminals of amplifiers 27 and 31 are connected to a sector counter 33. Counter 33 counts the number of sectors in response to a sector mark signal S1 in accordance with sector markers 23 from detector 25 and a reference mark signal S2 in accordance with reference position mark detector 29. Counter 33 counts up every time counter 33 receives sector mark signal S1. Sector counter 33 outputs the signal in accordance with the counting number to CPU 34. Counter 33 is reset by reference mark signal S2.

An optical head 35 is located under optical disc 11, close to and facing the underside planar surface of optical disc 11. Optical head 35 is mounted to a carrier of a linear motor (not shown) for moving optical head 35. The linear motor is coupled to a motor driver (not shown) for driving optical head 35. When the linear motor is driven by the motor driver, optical head 35 is radially moved in a direction radially from the center to the perimeter of optical disc 11.

Optical head 35 includes a semiconductor laser 37 for emitting a laser beam. A collimating lens 39 collimates the laser beam emitted by semiconductor laser 37. A splitter 41 splits the laser beam emanated from collimating lens 39. The laser beam split by splitter 41 is focused on a surface of optical disc 11 by an objective lens 43. A first lens actuator 45 moves objective lens 43 along one optical axis of objective lens 43 (up and down in FIG. 1). A second lens actuator 47 moves objective lens 43 along the direction perpendicular to the optical axis of objective lens 43 (side to side in FIG. 1).

Objective lens 43 causes the laser beam reflected from the surface of optical disc 11 to parallel the laser beam and to return to splitter 41. The parallel laser beam is focused on a photo sensor 49 through an antigmatic unit 51 including a cylindrical lens 53 and a convex lens 55. Photo sensor 49 includes four photoelectric elements (not shown). The outputs of the four photoelectric elements are used for controlling the position of objective lens 43; that is, first and second lens actuators 45 and 47 operate in response to the outputs of the four photoelectric elements.

An output terminal of photo sensor 49 is coupled to an input terminal of a binary coding circuit 57 for generating a binary signal S3 in response to an output signal S4 of photo sensor 49. Binary coding circuit 57 serves at least two functions. One function relates to focusing objective lens 43 by controlling first lens actuator 45. The other function relates to tracking objective lens 43 by controlling second lens actuator 47. The details of photo sensor 49 and the at least two functions of binary coding circuit 57 are disclosed by U.S. Pat. No. 4,682,613, incorporated herein by reference.

An output terminal of binary coding circuit 57 is coupled to an input terminal of a demodulator 59 for demodulating signal S3 into a demodulated signal S5. As will be explained, according to the present embodiment, a 2-7 code modulating method is adopted An output terminal of demodulator 59 is coupled to an input terminal of control signal eliminating circuit 61 for detecting control signals, such as a synchronous code, from signal S5 and generating signals S6 after eliminating the control signals from signal S5.

An output terminal of control signal eliminating circuit 61 is coupled to an input terminal of de-interleave circuit 63 for de-interleaving signal S6 into signals S7. Signals are recorded after interleaving to reduce burst error. An output terminal of de-interleave circuit 63 is coupled to an input terminal of an error correcting circuit 65 for correcting any error of signals S7 and generating signals S8 with reduced error. An output terminal of error correcting circuit 65 is coupled to an input terminal of a buffer 67. An output terminal of buffer 67 is coupled to an input terminal of interface circuit 69. Signals S9 output from buffer 67 are sent to a host computer (not shown) through interface 69.

An interface circuit 71 receives signal S10 supplied from the host computer to be written on optical disc 11. Signals S10 are supplied to an input of a correcting code addition circuit 77 through a buffer 75. Correcting code addition circuit 77 adds a code for correcting signals when reading data from optical disc 11 to generate signal S11. Correcting code addition circuit 77 and error correction circuit 65 are in a complimentary relationship.

An output terminal of correcting code addition circuit 77 is coupled to an input terminal of an interleave circuit 79 for interleaving signal S11 to generate interleaved signal S12. Interleave circuit 79 shuffles signals in order to be able to correct signals after burst error as is well-known in the art.

An output terminal of interleave circuit 79 is coupled to an input terminal of a control signal addition circuit 81 for adding control signals, such as synchronous code, to interleaved signal S12 in order to generate signals S13.

An output terminal of control signal addition circuit 81 is coupled to a modulator 83 for modulating signal S13 to generate modulated signal S14. As described above, a 2-7 code method is adopted as the preferable modulation method.

An output terminal of modulator 83 is coupled to one of two input terminals of a driver 85 for driving semiconductor laser 37. An output terminal of driver 85 is coupled to a control terminal of semiconductor 37. Driver 85 generates and supplies driving signal S15 for semiconductor laser 37 in response to signal S14.

Semiconductor laser 37 has two laser irradiating spots. One is toward collimating lens 39. Another is used for monitoring the laser beam irradiated by semiconductor laser 37. The monitored laser beam is incident on photo sensor 87 for generating signals S16 in response to the laser beam received.

An output terminal of photo sensor 87 is coupled to one of the input terminals of an operational amplifier 89 through amplifier 91 which generates signals S17 by amplifying signals S16.

Operational amplifier 89 substracts a reference signal from signal S17 to generate signal S18. The subtracted reference voltage V is supplied at a point 93, another input terminal of operational amplifie 89. Signal S18, on the other hand, is supplied to a second input terminal of driver 85.

In response to signals S18, driver 85 generates control signal S15 as necessary to force the intensity of the laser beam to be uniform when driver 85 drives semiconductor laser 37 in response to signal S14.

Turn table 15 is rotated by a motor 93 through shaft 17. A motor control circuit 95 controls the movement of motor 93. Motor control circuit 95 includes a phase comparator 97 for comparing a phase of a signal S19 output by motor 93, corresponding to the rotational speed of motor 93, to the frequency of a reference clock signal S20 to generate a signal S21 indicating a phase difference between signals S19 and S20.

An output terminal of phase comparator 97 is coupled to an input terminal of a low pass filter (hereinafter referred to as a L.P.F.) 98 for blocking a high frequency component of signal S21 to generate a signal S22 corresponding to the phase difference between signals S19 and S20.

An output terminal of L.P.F. 98 is coupled to an input terminal of motor driver 99 for driving motor 93, i.e., the driver 99 amplifies signal S22 into a signal S23 and supplies signal S23 to a control terminal of motor 93. The operation of motor control circuit 95 is controlled by CPU 34 which supplies a control signal S24.

Motor control circuit 95, as constructed above, supplies signal S23 synchronous with reference clock signal S20 for motor 93 so that motor 93 is rotated at a constant rotation speed.

Figure 4:
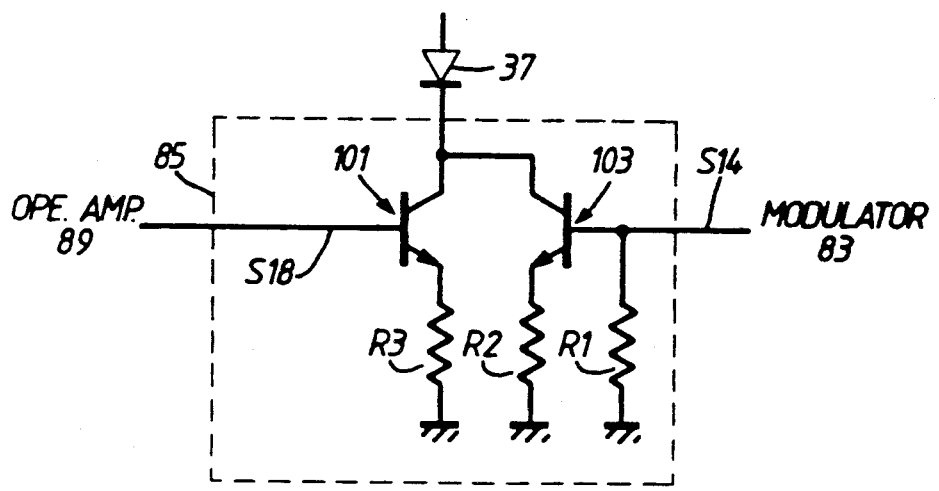
FIG. 4 is a circuit diagram of a driver 85 used in the optical disc recording device shown in FIG. 1.

Referring now to FIG. 4, the details of driver 85 will be explained. Driver 85 includes first and second transistors 101 and 103. The base of second transistor 103 is coupled to the output terminal of modulator 83 and ground through a first resistor R1. The base of first transistor 101 is coupled to the output terminal of operational amplifier 89. The collectors of first and second transistors 101 and 103 are coupled to semiconductor laser 37. The emitters of first and second transistors 101 and 103 are coupled to ground through third and second resistors R3 and R2 respectively. According to the above construction, the current, which is supplied for semiconductor laser 37, is generated by first and second transistors 101 and 103 in response to signals S14 and S18.

Again referring to FIG. 1, buffer 75, correcting code addition circuit 77, interleave circuit 79, control signal addition circuit 81 and modulator 83 operate in accordance with a signal-transferring clock signal CK1.

Signal-transferring clock signal CK1 is generated by a reference clock generator 105 and a programmable synthesizer 107 as shown in FIG. 1. Reference clock generator 105, such as a quartz oscillator, generates a reference clock signal R. Programmable synthesizer 107 divides the frequency of reference clock R in accordance with signals S25 supplied from CPU 34 so as to generate clock signals with a predetermined frequency.

Figure 5:
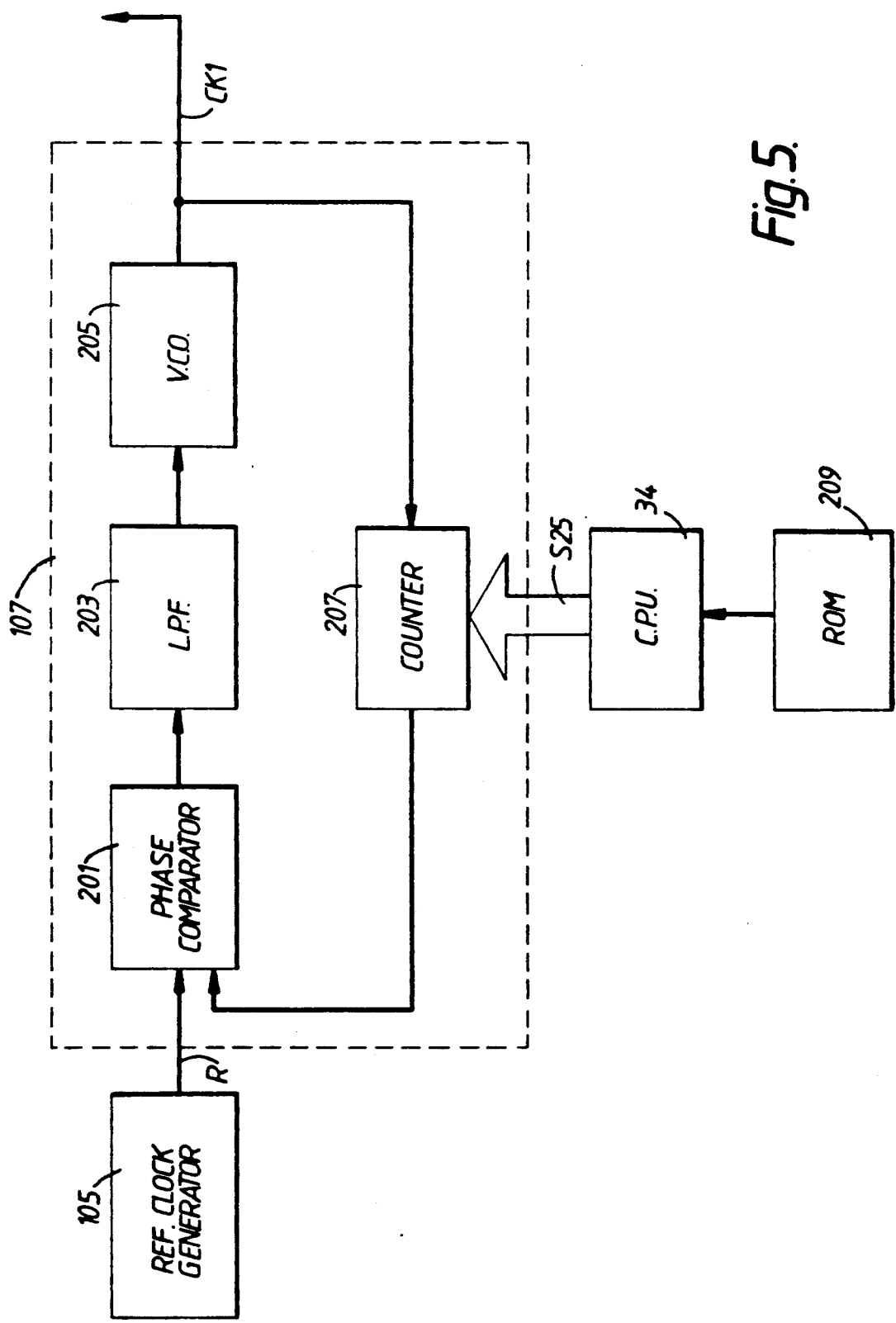
FIG. 5 is a circuit diagram of a programmable synthesizer used in the optical disc recording device shown in FIG. 1.

Referring now to FIG. 5, the details of programmable synthesizer 107 are explained. Programmable synthesizer 107 includes a phase comparator 201 for generating a signal indicating the frequency difference between two inputs. An output terminal is coupled to an input terminal of an L.P.F. 203 for passing only a low frequency signal. An output terminal of L.P.F. 203 is coupled to an input terminal of a voltage controlled oscillator (hereinafter referred to as V.C.O.) 205 for generating a signal with a frequency in accordance with a voltage of the input signal. The signal generated by V.C.O. 205 will be hereinafter referred to as the signal-transferring clock signal CK1.

An output of V.C.O. 205 is coupled to an input of a counter 207 for generating signals every time the number of signals output by V.C.O. 205 reaches a predetermined number, which CPU 34 supplies for counter 207. An output terminal of counter 207 is coupled to an input terminal of phase comparator 201. Another input terminal of phase comparator 201 is coupled to an output terminal of reference clock generator 105.

Programmable synthesizer 107 outputs signal-transferring clock signal CK1 synchronously with reference clock signal R. That is, the phase of signal-transferring clock signal CK1 is coincident with that of reference clock signal R due to the phase comparator 201. The frequency of signal-transferring clock signal CK1, however, is different from that of reference clock signal R due to counter 207. As described above, the frequency of signal-transferring clock signal CK1 is varied in accordance with signal S25 from a ROM 209 through CPU 34.

ROM 209 stores the relationship between signals S25 and address information for addressing optical disc 11, such as a track number and a block number. The address information indicates the distance between the center of the optical disc 11 and a recording position at which signals are written or read. That is, the address information relates to the radius on optical disc 11.

Figure 6:
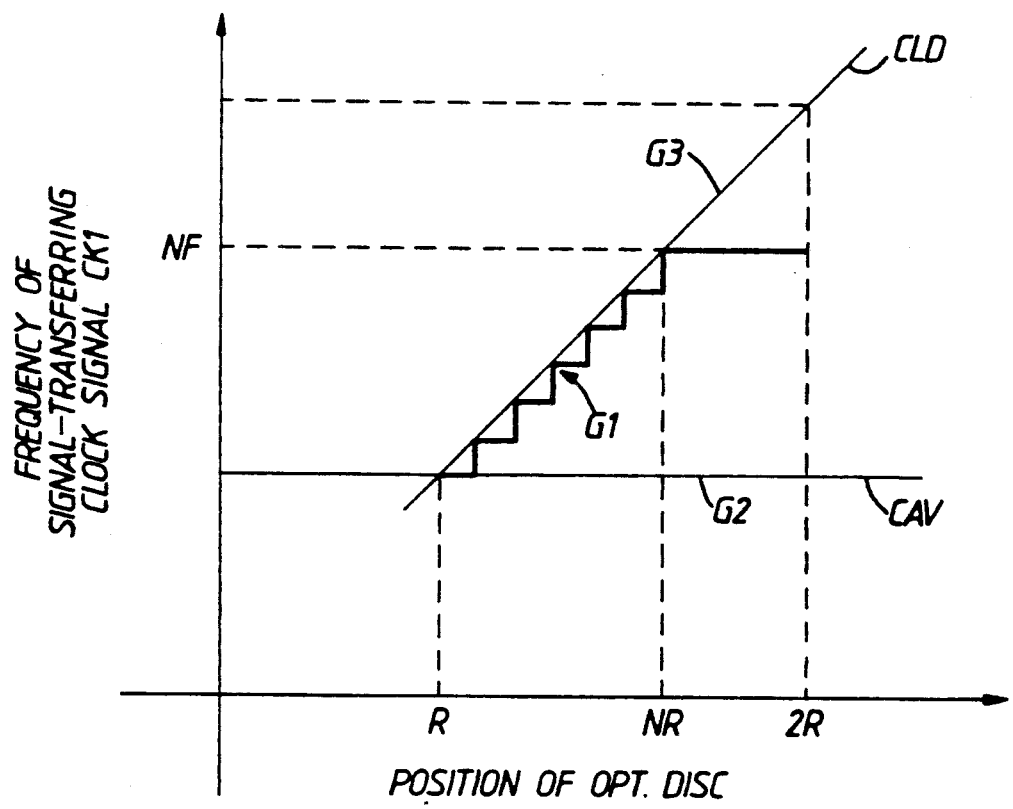
FIG. 6 shows the relationship between signal-transferring clock signal CK1 used in the optical disc recording device shown in FIG. 1 and the position of the optical disc shown in FIG. 2.

FIG. 6 illustrates the relationship stored by ROM 209, i.e., the relationship between signal-transferring clock signal CK1 and the recording position. Signal S25 corresponds to signal-transferring clock signal CK1. Signal-transferring clock signal CK1 is substantially proportional to the radius of optical disc 11 within a specified area as indicated by a stepped characteristic line G1 shown in FIG. 6.

Signal-transferring clock signal CK1 is varied in discrete steps in regard to the recording position on optical disc 11. As shown in FIG. 6, signal-transferring clock signal CK1 is increased step-wise as the recording position increases from the center of optical disc 11, i.e., the number of tracks is increased, until a predetermined position NR of optical disc 11 where N is a number between one and two, preferably 1.5 and R is a radius of optical disc 11 for defining the beginning of a first region of recording surface. At a position more than the predetermined position NR, signal-transferring clock signal CK1 is constant at value NF in regard to the recording position on optical disc 11. The radius NR defines the beginning of a second region of recording surface.

FIG. 6 illustrates two characteristic lines G2 and G3. Line G2 indicates a relationship between signal-transferring clock signal CK1 and the recording position under a Constant Angular Velocity method (hereinafter CAV method). According to the CAV method, optical disc 11 is rotated at a constant angular velocity or rotation speed and the frequency of signal-transferring clock signal CK1 is constant. Line G3 indicates the relationship under a Constant Linear Density method (hereinafter CLD method). According to the CLD method, optical disc 11 is rotated at a constant angular velocity and the frequency of signal-transferring clock signal CK1 is varied so that a spacing or interval between adjacent data recording positions or pits is set at a predetermined constant distance along the tracks. As the recording position increases radially outward from the center of optical disc 11, a linear or tangential velocity at the recording position becomes a more important design consideration. (Tangential velocity $v = w \times r$ where w is the angular velocity and r is the radius.) This is because the angular velocity of optical disc 11 is constant. In order to maintain the interval between adjacent pits constant, the recording operation must be performed more quickly. For example, if the linear velocity at the recording position P1 is twice as fast as that at the recording position P2, then, the operation of recording at the position P1 must be done within half of the time required at the position P2. That is, the frequency of signal-transferring clock signal CK1 linearly increases as a function of increasing radius of optical disc 11 under the CLD method.

Figure 7:
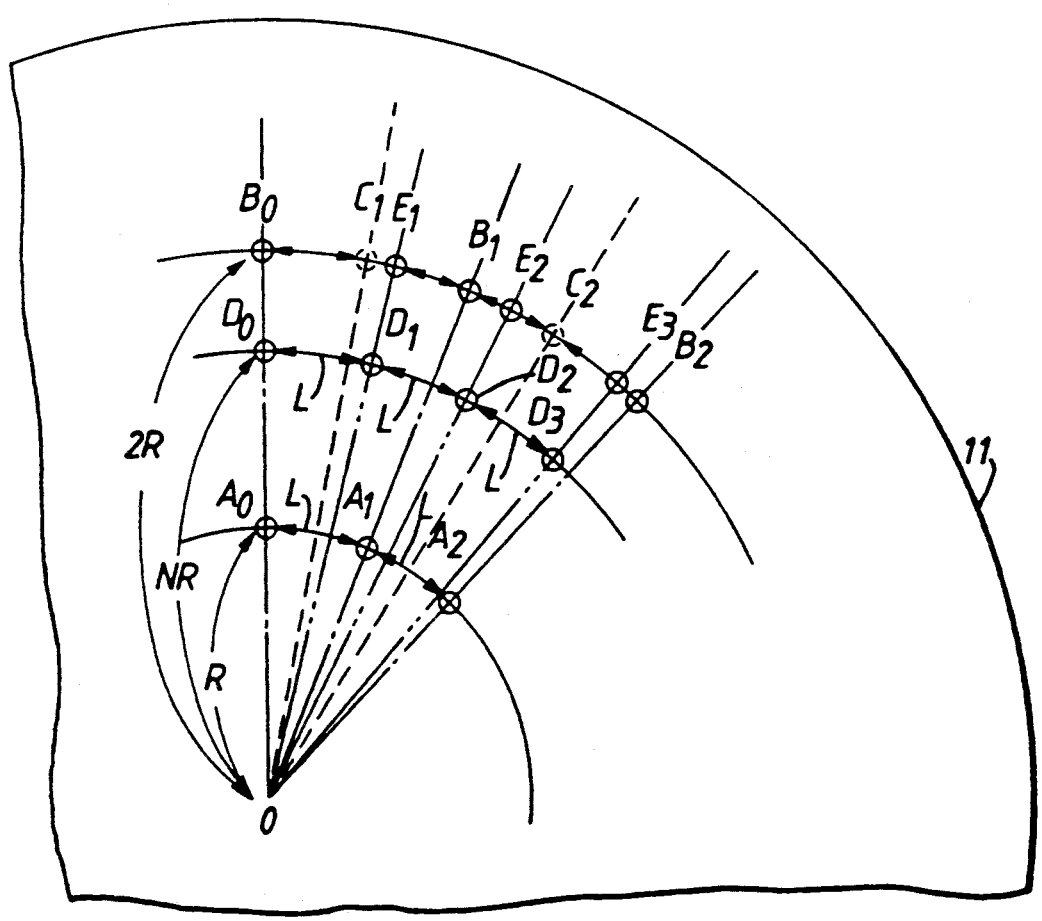
FIG. 7 illustrates the recording of data in pits on the optical disc shown in FIG. 2.

Characteristic line G2 indicates that the clock signal CK1 is constant in respect to the recording position on optical disc 11 in the CAV method. That is, the frequency of signal-transferring clock signal CK1 is constant regardless of the position on optical disc 11. Referring now to FIG. 7, a plurality of pits, e.g., $A_0$, $A_1$, $A_2$, are made at the predetermined interval L on the track at the radius R under the CAV method.

At the radius 2R, i.e., on the track with twice the circumference, a plurality of pits, e.g., $B_0$, $B_1$, $B_2$, are made at the interval 2L, twice the predetermined interval L at the radius R. This is because pits are made under the condition of constant angular velocity. The recording density of pits along the track under the CAV method as represented by the track at radius NR-2R is constant regardless of the radius of optical disc 11.

Characteristic line G3 is linearly increasing with respect to increasing radius of optical disc 11, from the radius R to 2R as shown in FIG. 6. For example, the frequency of signal-transferring clock signal CK1 at the radius 2R is twice as high as that at the radius R. Referring again to FIG. 7, if a plurality of pits, e.g., $A_0$, $A_1$, $A_2$, are made at the radius R, a plurality of pits, e.g., $B_0$, $C_1$, $B_1$, $C_2$, $B_2$, are made at the radius 2R. The spacing between pits $B_0$, $C_1$; and between $B_1$, $C_2$; at the radius 2R is a constant L. That is, the recording density of pits, i.e., the spacing between pits along the track, is constant under the CLV method. However, as the radius increases, the frequency of signal-transferring clock signal CK1 at the recording position must be increased. So, the recording conditions become more severe as the radius of optical disc 11 increases, or the recording point is further removed from the center of optical disc 11 under the CLV method.

Characteristic line G1 linearly increases with the radius of optical disc 11 in a first area within the predetermined radius NR. Characteristic line G1 is constant in regard to the radius of optical disc 11 in an area greater than the predetermined radius NR. That is, the frequency of signal-transferring clock signal CK1 is linear in regard to the radius of optical disc 11 within the predetermined radius NR and is constant in regard to the radius of optical disc 11 at radii greater than the predetermined radius NR.

According to signal-transferring clock signal CK1 indicated by characteristic line G1, a plurality of pits, e.g., $A_0$, $A_1$, $A_2$, are made at the predetermined interval L along the track at the radius R as shown in FIG. 7. A plurality of pits, e.g., $D_0$, $D_1$, $D_2$, are made at the predetermined interval along the track at the radius NR. That is, the recording density of pits is maintained constant along the track between the radius R and NR. Strictly, the frequency of signal-transferring clock signal CK1 is varied stepwise from track to track so that the recording density of pits is not constant but varied slightly. The difference in frequency of signal-transferring clock signal CK1 between adjacent tracks is small so that the recording density of pits is regarded as practically constant.

At a radius greater than radius NR, signal-transferring clock signal CK1 is constant in regard to the radius. That is, the frequency NF of signal-transferring clock signal CK1 is constant regardless of the radius more than the radius NR. So, it is easy to control the frequency of signal-transferring clock signal CK1, i.e., the recording of pits on optical disc 11. For example, according to the present invention, a plurality of pits at the radius 2R, e.g., $B_0$, $E_1$, $E_2$, $E_3$ are made under the CAV method. The spacing between adjacent pits is longer as the radius is longer. That is, the recording density of pits is smaller as the radius increases; that is, the recording quantity of pits per track is constant more than the radius NR.

Figure 8:
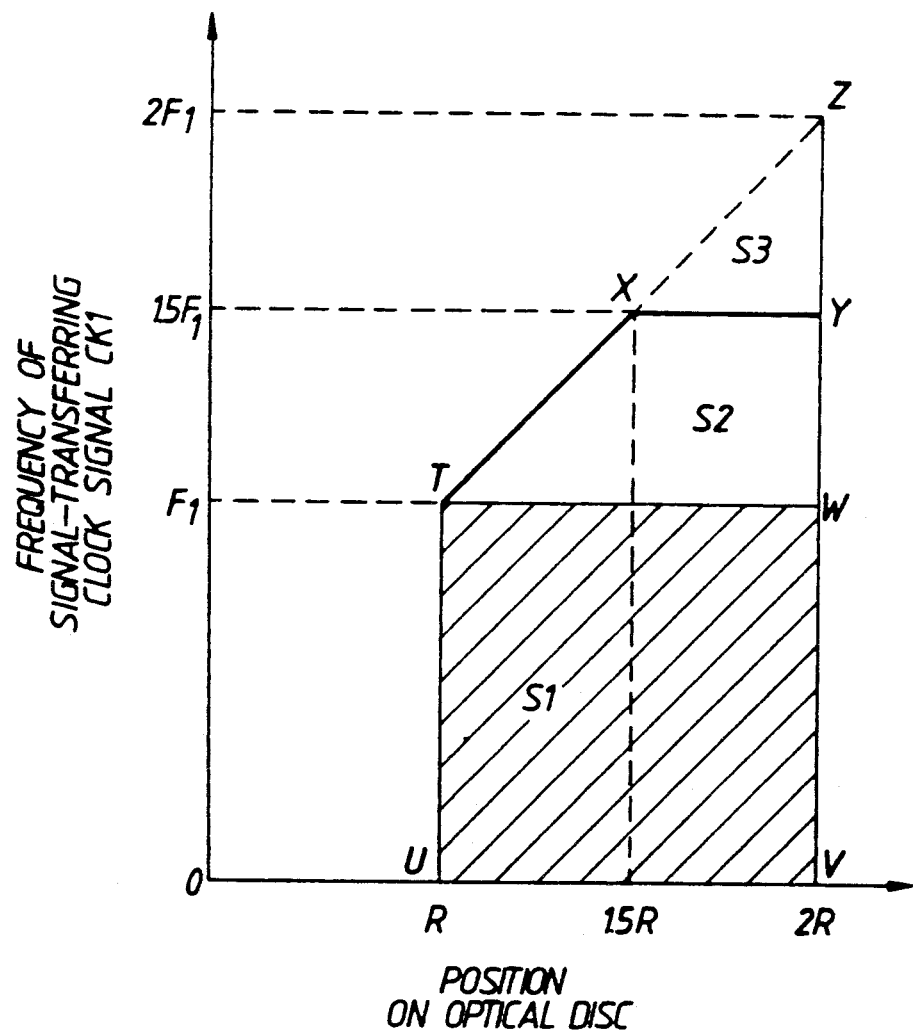
FIG. 8 shows the relationship between frequency of the signal-transferring clock signal CK1 and the position of the optical disc shown in FIG. 2.
Figure 9:
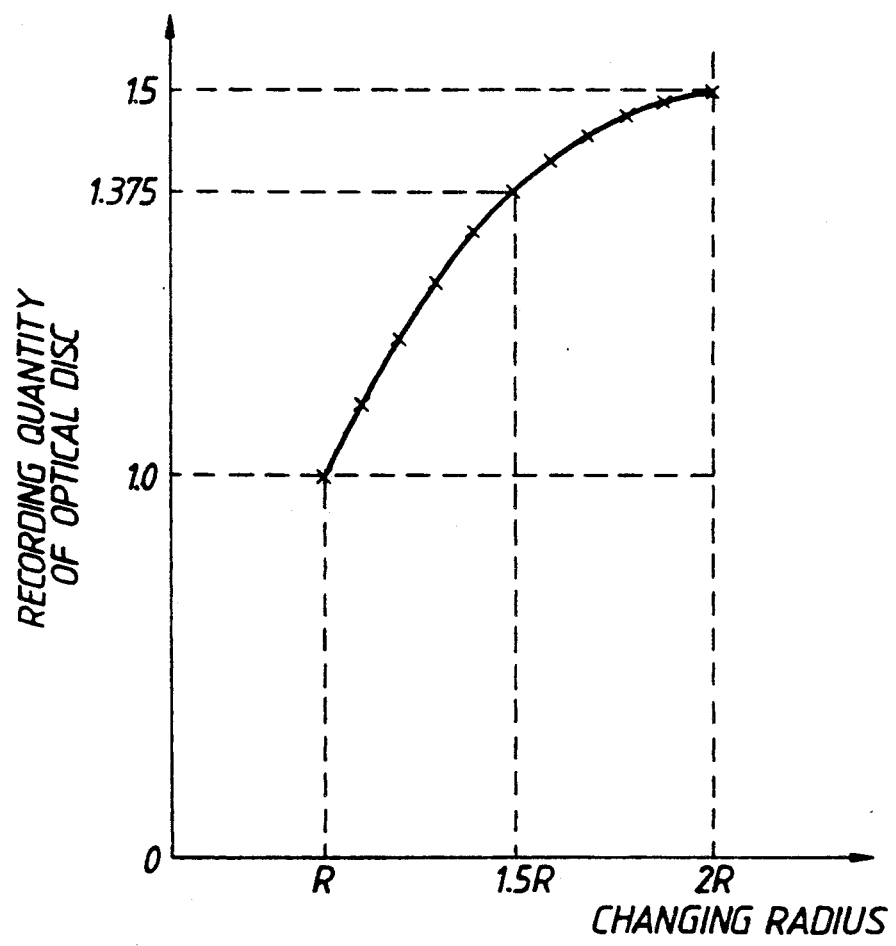
FIG. 9 shows the relationship between recording quantity of the optical disc shown in FIG. 2 and a changing radius.

Referring now to FIGS. 8 and 9, the recording quantity of optical disc 11 will be explained.

The recording quantity of optical disc 11 is proportional to the dimensions and area of a figure in FIG. 8. This is because the signal-transferring clock signal CK1 relates to the recording density. The recording position of optical disc 11 as R increase from R to 2R relates to the dimensions of each recording area; that is, between R and 1.5R and between 1.5R and 2R.

The recording quantity of optical disc 11, under the CAV method, when the frequency of signal-transferring clock signal CK1 is equal to a constant value $F_1$ between radius R and 2R, is proportional to a hatched area S1 indicated by the four points T, U, V and W shown in FIG. 8.

The recording quantity of optical disc 11, if recorded under the CLV method, (i.e., the frequency of signal-transferring clock signal CK1 is linearly increasing between radius R and 2R, and the frequency is varied from $F_1$ to $2F_1$) is proportional to an area $(S_1+S_2+S_3)$ indicated by the four points T, U, V and Z. (The area $S_2$ is indicated by the four points T, W, Y and X shown in FIG. 8. The area $S_3$ is indicated by the three points X, Y and Z shown in FIG. 8.)

The area $(S_1+S_2+S_3)$ is one and one-half times as large as the area $S_1$. This is because the area $(S_2+S_3)$ is half as large as the area $S_1$. However, it is difficult to control the frequency of signal-transferring clock signal CK1 when recording far from the center of optical disc 11. This is because the frequency of signal-transferring clock signal CK1 is higher as the recording point is farther from the center and because the laser power and recording margin at the perimeter of the disc also become difficult to control.

In accordance with the present invention, the frequency of signal-transferring clock signal CK1 is approximately linear in regard to the radius less than the radius NR, and constant for a radius more than NR, for example, where N=1.5. In this case, the recording quantity of optical disc 11 is proportional to an area $(S_1+S_2)$ indicated by the five points T, U, V, Y and X. The area $S_2$, indicated by the four points T, W, Y and X, is an incremental increase in comparison with that under the CAV method.

The recording quantity of optical disc 11 depends on N, i.e., the radius (hereinafter referred to as the change-over radius) more than which the frequency of signal-transferring clock signal CK1 is constant. The following table and FIG. 9 show the relationship between the change-over radius and the recording quantity.

TABLE

| CHANGE-OVER RADIUS | RECORDING QUANTITY |
|---|---|
| 1.0 R | 1.0 |
| 1.1 R | 1.095 |
| 1.2 R | 1.18 |
| 1.3 R | 1.255 |
| 1.4 R | 1.32 |
| 1.5 R | 1.375 |
| 1.6 R | 1.42 |
| 1.7 R | 1.455 |
| 1.8 R | 1.48 |
| 1.9 R | 1.495 |
| 2.0 R | 1.5 |

As described above, the frequency of signal-transferring clock signal CK1 is not continuous but rather is stepped, i.e., a stair case, in regard to the radius of optical disc 11. The frequency difference between adjacent steps is decided by considering the reproduction of signals on optical disc 11 as follows.

Figure 10:
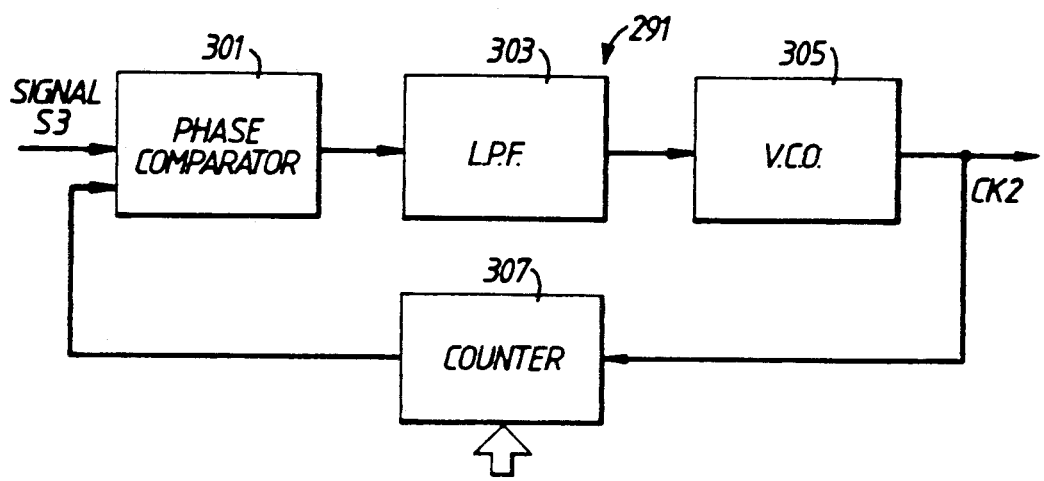
FIG. 10 is a conceptional block diagram of a clock extracting circuit used in the optical disc recording device shown in FIG. 1.

Signal S3, output from binary coding circuit 57, generally fails to be synchronous with signal-transferring clock signal CK1. Demodulator 59 includes a clock extracting circuit 299 as shown in FIG. 10. Clock extracting circuit 299 extracts clock signals (hereinafter referred to as clock CK2) from signal S3 including a periodically specified signal.

Clock CK2 is supplied for control signal eliminating circuit 61, de-interleave circuit 63, error correcting circuit 65 and buffer 67, which use clock CK2 for operating. Demodulator 59 also uses clock signal CK2 for demodulating.

From a theoretical point of view, the clock extracting circuit 299 includes a phase comparator 301, a L.P.F. 303, a V.C.O. 305 and a counter 307 in the same manner as programmable synthesizer 107 shown in FIG. 5. The difference between the clock extracting circuit 299 and programmable synthesizer 107 is the input to phase comparator 301.

Phase comparator 201 in programmable synthesizer 107 receives reference clock signal R. Phase comparator 301 in the clock extracting circuit 299 receives signal S3, which is a binary signal generated by binary coding circuit 57.

Phase comparator 301 compares a phase difference between signal S3 and a signal from counter 307 when an edge of signal S3 (a binary signal) is detected. That is, phase comparator 301 assures the phase difference between signal S3 and the signal from counter 307 at the beginning, i.e., the edge of signal S3.

Figure 11:
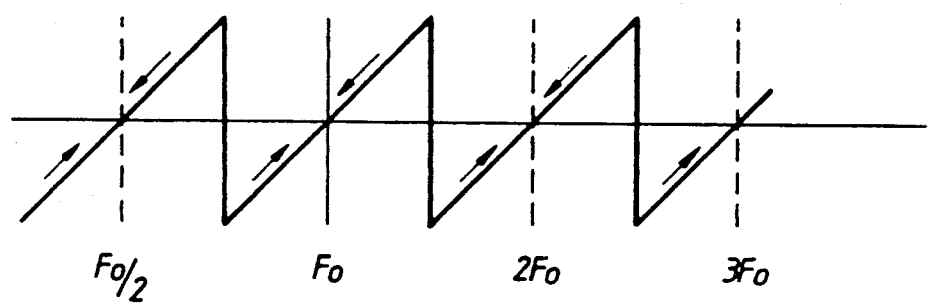
FIG. 11 illustrates the phase lock characteristic of the clock extracting circuit shown in FIG. 10.

As a result, the phase comparing characteristic of phase comparator 301 is as shown in FIG. 11. Note that there are a plurality of points (hereinafter referred to as lock points) for locking a frequency of clock signal CK2. It is possible for clock signal CK2 to drop into a different lock point from that intended to be locked.

Figure 12:
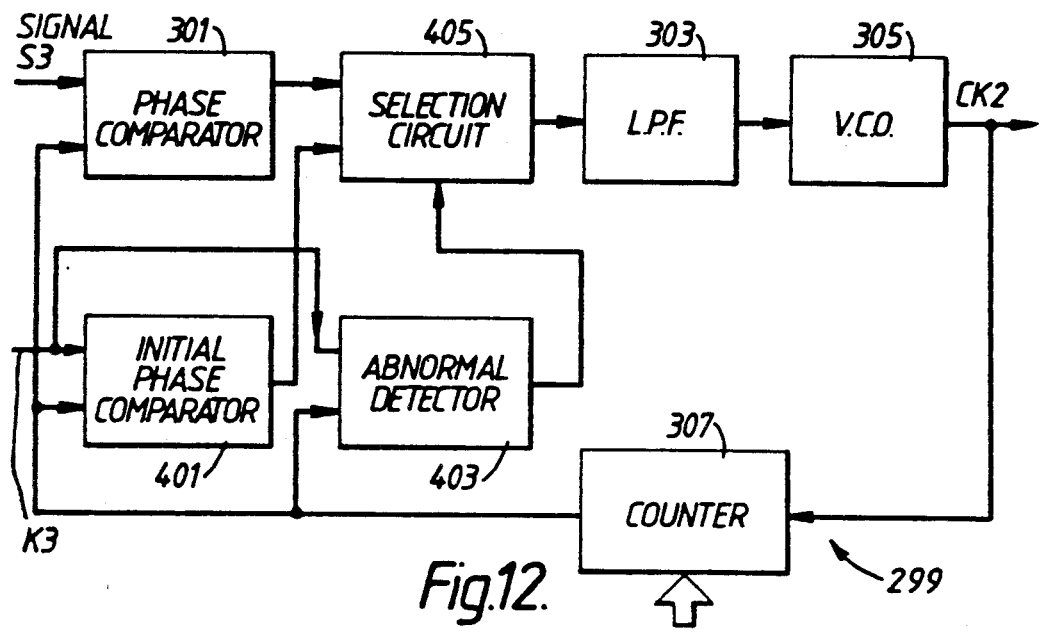
FIG. 12 is a block diagram of the clock extracting circuit considering the phase lock characteristic of the clock extracting circuit.

Considering a plurality of lock points, the clock extracting circuit is constructed as shown in FIG. 12. An initial phase comparator 401, an abnormal detector 403 and a selection circuit 405 are added into the theoretical construction as shown in FIG. 10.

Initial phase comparator 401 compares the output of counter 307 with a reference clock signal CK3. Reference clock signal CK3 is generated in the same way as signal-transferring clock signal CK1 in accordance with address data indicating the position for reproducing signals on optical disc 11. If CPU 34 gets the address data information for reproducing data, CPU 34 is able to know the frequency of signal-transferring clock signal CK1 by use of a look up table of ROM 209. CPU 34 then generates reference clock signal CK3, the frequency of which is the same as that of signal-transferring clock signal CK1 in accordance with the address data for radii between radius R and the radius NR.

Abnormal detector 403 detects whether or not the frequency of the input counter signal from counter 307 to phase comparator 301 or initial phase comparator 401 exceeds (100±6) % of the frequency of reference clock signal CK3. Selection circuit 405 either selects the output of phase comparator 301 or of initial phase comparator 401 for the input signal to L.P.F. 303. In the first pass through the loop, however, an output of initial phase comparator 401 is selected. After selection circuit 405 switches the input signal to L.P.F. 303 back to the output of phase comparator 301, and abnormal detector 403 performs the detection operation described above when the phase goes out of the predetermined limits.

Let us assume that selection circuit 405 has selected the output of phase comparator 301 for input to LPF 303. If the frequency of the input signal to L.P.F. 303, i.e., an output signal of phase comparator 301, is within (100±6) % of that of reference clock CK3, abnormal detector 403 outputs a signal causing selection circuit 405 to continue to pass the signal from phase comparator 301 toward L.P.F. 303.

If the frequency of the input signal to L.P.F. 303 exceeds (100±6) % of that of reference clock signal CK3, abnormal detector 403 outputs a signal causing selection circuit to pass an output signal of initial phase comparator 401 toward L.P.F. 303. The abnormal detector 403 outputs a signal to selection circuit 405 each time the selection circuit 405 switches from one selection to the other.

The operation of the clock extracting circuit shown in FIG. 12 is explained. Let it be assumed that optical head 35 reproduced data at a first position on optical disc 11 and then optical disc 11 attempts to access a second position in accordance with address data input by an operator.

At first, CPU 34 determines the frequency of reference clock signal CK3 corresponding to the address data, i.e., the radius, at the second position. CPU 34 then causes optical head 35 to access the second position. Reference clock signal CK3 determined by CPU 34 is supplied to initial phase comparator 401. Before long, clock signal CK2 is synchronous with reference clock signal CK3. The frequency of clock signal CK2 is fixed at one of the lock points.

After that, selection circuit 405 disconnects the output terminal of initial phase comparator 301 with that of L.P.F. 303 and connects the output terminal of phase comparator 301 with the input terminal of L.P.F. 303. In this condition, the phase of clock signal CK2 is synchronous with that of signal S3. By means of initial phase comparator 401, the frequency of clock signal CK2 is coincident with that of CK3, i.e., that of signal S3. Note that the frequency of reference clock signal CK3 is the same as that of signal S3 if optical head 35 accesses correctly.

As described above, the frequency of signal-transferring clock signal CK1, which is used for recording at optical disc 11, is varied in accordance with a staircase (hereinafter referred to as a frequency jump). A jump of the frequency of signal-transferring clock signal CK1 exists at the boundary between adjacent tracks. The frequency jump is so large that it is unable to perform a phase lock of clock signal CK2 when the access position is different from the position that the operator inputs to be accessed.

This is because the frequency of reference clock signal CK3 is different from that of signal S3. CPU 34 generates reference clock signal CK3 in accordance with the position that the operator inputs to be accessed. Signal S3 is generated in accordance with the position accessed by optical head 35. In the present condition, optical head 34 accesses the other position differently from the position to be accessed. By means of a loop comprising initial phase comparator 401, L.P.F. 303, V.C.O. 305 and counter 307, clock signal CK2 is made to be synchronous with reference clock signal CK3. More strictly saying, the frequency of clock signal CK2 is coincident with that of reference clock signal CK3. After that, a loop comprising phase comparator 301, L.P.F. 303, V.C.O. 305 and counter 307 is established. The frequency of signal S3, however, is different from that of clock signal CK2. This is because the access position is different from that to be accessed. The loop including phase comparator 301 is unable to perform a phase lock of clock signal CK2 if the frequency jump is so large. As the phase lock operation fails, the frequency of clock signal CK2 fails to be fixed at the correct value.

In this case, the optical disc device is unable to demodulate the data on optical disc 11 if the frequency of clock signal CK2 is much different from the optimal. If so, the optical disc device is unable to know the actual position that optical head 35 accesses. The optical disc device fails to control optical head 35 because of the insufficiency of the information of the optical head's position.

In accordance with the present invention, the frequency jump is intentionally set smaller than the largest frequency fluctuation that the optical disc device is able to demodulate the modulated data on optical disc 11. In the above condition, if optical head 35 accesses the adjacent track in error, the optical disc device is able to demodulate the modulated data on optical disc 11. The modulated data includes the address data of the track including the demodulated data. The optical disc device is able to know the position accessed by optical head 35 so that the optical disc device controls optical head 35 to access the position to be accessed again.

As described above, the optical disc device uses the 2-7 code modulation scheme. The largest frequency fluctuation is ±6.25% of the value of the frequency under the 2-7 code modulation scheme. Considering this figure, it is desirable that the frequency jump is preferably set smaller than ±6%. In the present embodiment, the frequency jump is preferably set at 1%. Furthermore, abnormal detector 403 judges no abnormal state exists when the frequency difference is less than 6% and an abnormal state exists when the frequency difference is more than 6%.

The laser power of semiconductor laser 87 will now be explained. The optical disc device, in accordance with the present embodiment, adopts a heat mode recording method. Under the heat mode recording method, heat generated by a laser beam causes changes on the surface of optical disc 11, for example, makes pits on optical disc 11. Recording depends on an energy J generated by the laser beam and the sensitivity of optical disc 11. Energy J generated by the laser beam is described by the following:

(the power P of laser 87 in watts)×(the time duration $T_p$ of power-on time of the laser in seconds).

Under the method in which the rotational speed of optical disc 11 is constant, e.g., the CAV or the CLD method, the linear velocity is larger as the recording point is further from the center of optical disc 4. Let it be assumed that the radius at the most outer point of a recording area is twice as far as that the most inner point of the recording area. The velocity at the most outer point is twice as fast as that at the most inner point. This is because the rotational speed of optical disc 11 is constant.

The doubling of velocity affects the time length $T_p$ effectively. For example, the energy J, at the most inner point, is indicated by $J_1=P_1 \times T_{p1}$, where $P_1$ indicates the laser power and $T_{p1}$ indicates the laser time duration at the most inner point of the recording area. In this case, the effective time duration at the most outer point is $(T_{p1})/2$ because of the velocity doubling. So, the energy $J_2$ at the most outer point is indicated by $J_2=P_2 \times (T_{p1})/2$.

If the recording conditions are maintained constant in spite of the variation in recording points between R and 2R, it must be satisfied that the energy $J_1$ at the most inner point is equal to the energy $J_2$ at the most outer point. Therefore, $P_2$ must be set at $2P_1$. However, it is difficult to adjust the laser power to be twice as strong as that at the most inner position. After all, the recording conditions under the CAV or CLD method are extremely difficult at the perimeter of the disc.

Figure 13:
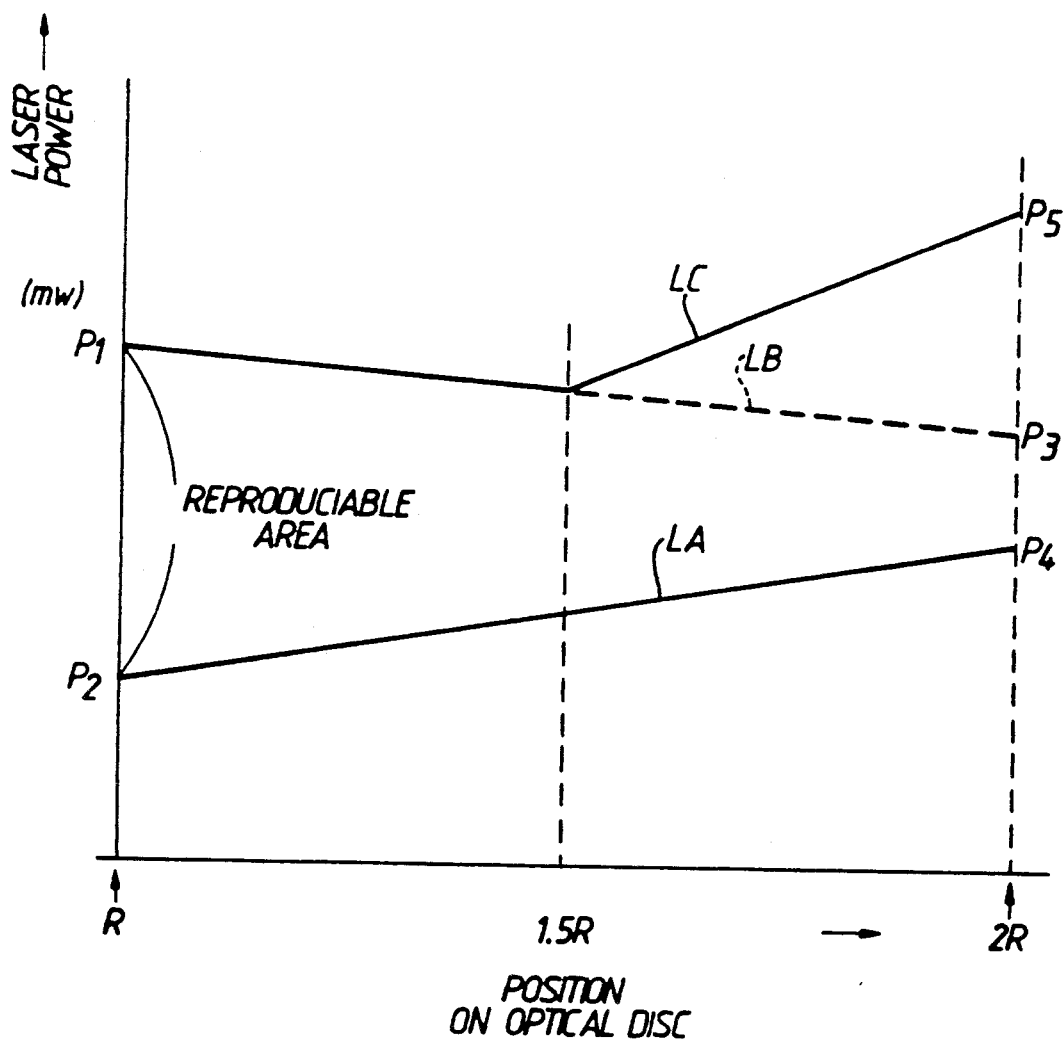
FIG. 13 illustrates recording margin of a laser used in the optical disc recording device shown in FIG. 1.

FIG. 13 shows the characteristic of the margin of the power of semiconductor laser 87 according to the present embodiment. A linear line LA and a bent line LC indicate the margin of power of semiconductor laser 87. Note that the time duration $T_p$ is maintained constant in spite of the recording position, i.e., the radius of optical disc 11. To complete the margin of power of the semiconductor laser 87 as shown in FIG. 13, the following steps are required.

At first, the time length $T_p$ and the most suitable spacing between adjacent pits along the track are determined on the most inner point, for example, the radius R. Then, a plurality of recordings are performed as the power of semiconductor laser 87 is varied. After that, optical head 35 attempts to reproduce the pits recorded as the power of semiconductor laser 87 is varied.

In this case, a reproducible range of the power of semiconductor laser 87 in recording extends from the largest power level $P_1$ to the smallest $P_2$ as shown in FIG. 13 at the radius R.

In the same way as above, the reproducible range of laser 87 at the radius from the inner point R to the outer point 2R is examined. As shown in FIG. 13, the smallest power of laser 87 at every point forms line LA, for example, the smallest power of laser 87 at the most inner point (radius R) is $P_2$ and the smallest power of laser 87 at the most outer point (radius 2R) is $P_4$. $P_4$ is larger than $P_2$. This is because the angular speed at the most outer point (radius 2R) is twice as fast as that at the most inner point (radius R). The density of heat energy that laser 87, that is fixed, provides to the surface of optical disc 11 depends on the rotational speed of optical disc 11.

The largest power of laser 87 at every point from R to 2R forms a bent line LC. A dotted line LB indicates the largest power of laser 87 under the CLD method. The largest power of laser 87 according to the present embodiment is explained in comparison with that under the CLD method as follows.

Under the CLD method, the largest power of laser 87 at the most inner point is indicated by $P_1$ shown in FIG. 13. The largest power of laser 87 at the most outer point is indicated by $P_3$ shown in FIG. 13 at radius 2R. $P_3$ is smaller than $P_1$. This is because the liner velocity at the most outer point is twice as fast as that at the most inner point. Furthermore, in this case, the time length $T_p$ is made constant at every point of optical disc 11. So, the length of the surface of optical disc 11 exposed to laser 87 results in increased laser power as the recording position on optical disc 11 is further from the center of optical disc 11. If the power of laser 87 is large enough, larger pits are made at the more outer point on optical disc 11. As the size of the pit is larger, the margin of recording error is less. As is well known, it is desirable that the recording margin be as large as reasonably possible.

Under the present embodiment, the CAV method is adopted for radii greater than the radius NR, where N=1.5. This position is located at the position (1.5R/2R) of the radius 2R, i.e., ¾ of the radius from the center of optical disc 11. Under the CAV method, the frequency of signal-transferring clock signal CK1 is constant. The spacing between adjacent pits is longer. This is because the rotational speed is constant so that the linear velocity at the more outer point is larger. As the spacing increases, the recording margin is larger.

Before describing the substitute area feature of the present invention, the formation of defective portions in the recording area of an optical disc will be discussed in some detail. Referring briefly again to FIG. 2, a contiguous defective area may comprise portions of a plurality of blocks formed during manufacture in the recording area of the disc. Thus, the defective are may comprise a portion of a block, a number of adjacent blocks involve one or more adjacent blocks of adjacent tracks. The causes of a defective portion are various but may include imperfections in the composition of the disc or in the layered film coating of the disc.

Another category of defective memory portion is one related to the formation of the helical groove of the tracks of a disc. In this category, the defective memory portion may comprise a portion of a block or a number of adjacent blocks.

A third category of defect memory portion is related to the recording of data and, thus, may relate only to a single bit or pit formation.

In all three categories, a record of the address or addresses of the defective memory portion is preserved on a block by block basis. That is, all the addresses of all the blocks of a contiguous defective area are preserved while at the same time an entire block is presumed defective if only one defective pit is discovered.

Figure 14:
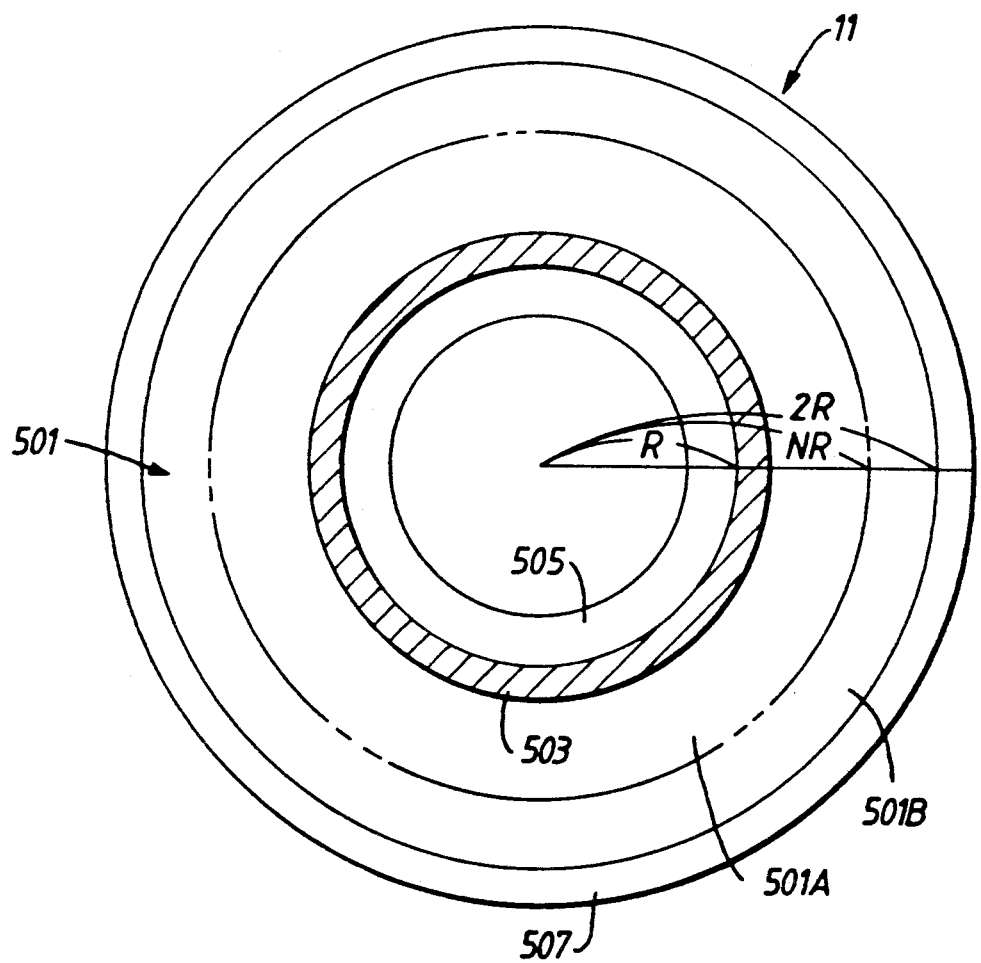
FIG. 14 illustrates a plurality of areas on the optical disc shown in FIG. 2 in accordance with the present invention.

Referring now to FIG. 14, a plurality of areas on the surface of optical disc 11 are explained. As explained above, an area (hereinafter referred to as a recording area) 501 between the radius R and 2R is used for recording comprising two areas, one between radius R and radius NR, 501A, and one between radius NR and radius 2R, 501B. Furthermore, a third area is defined according to the present invention. The third area, may be defined within the radius R or outside the radius 2R or may be within recording area 501A or recording area 501B and is used for a substitute area for recording data instead of a defective portion of a recording area uncovered during manufacture in the recording area 501.

According to FIG. 14, recording area 501 comprises two areas 501A and 501B. Area 501A is that recorded under the CLD method. Area 501B is that recorded under the CAV method. There also exist areas 505 and 507 which are typically not used for recording near the center and the periphery of optical disc 11. Indeed, when optical disc 11 is manufactured, may be determined whether any defective portions of the recording area are generated. If a defective portion is discovered, an area comprising a plurality of blocks corresponding to the defective portion is set up in a substitute area. That is, position information locating the defective blocks of the recording area are recorded in the substitute area. A portion of the substitute area (hereinafter referred to as a relief portion) is secured in the substitute area for recording data instead of the defective portion.

A defective portion of the recording area may also be detected during recording data. As is known from U.S. Pat. No. 4,835,757, in recording data, CPU 34 performs read-after-write operation. That is, CPU 34 reads the data just after the data is recorded and detects whether the read data is the same as that recorded. Usually, the data to be recorded, i.e., original data, is stored temporarily in a memory (not shown). If the read data is different from the original write data, CPU 34 determines that the block or blocks including the data which was defectively recorded is a defective memory portion. In the same manner as above, position information of the defective block or blocks are recorded and a relief portion is secured in the substitute area to replace the defective memory portion.

When CPU 34 attempts to record or reproduce data on optical disc 11, CPU 34 refers to the position information for the defective memory portion or blocks. When the host computer orders CPU 34 to access the area indicated by the address data coincident with that of the defective portion, CPU 34 records or reproduces data in the relief portion of the substitute area of optical disc 11.

Establishing a substitute area as described above is very convenient to a host computer or to the operator of a recording device. This is because the host computer or the operator can treat optical disc 11 as if it were a non-defective disc even though optical disc 11 may have a plurality of defective portions. Only when the defecative recording area exceeds the allocated substitute area must the entire disc be discarded.

When optical disc 11 is formatted, area 501A is formatted in accordance with the CLD method. Area 501B is formatted in accordance with the CAV method. Any substitute area proximate to or within area 501A is formatted in accordance with the CLD method. Information of the format is shared by a machine for formatting and the optical disc device.

In the preferred embodiment, substitute area 503 is defined between the radius R and the radius 1.01 R and is used as an area for recording data instead of the defective portions of the recording area. Thus, with the disc described inconnection with FIG. 2, it is appropriate to allocate only an area within R and 1.01 R for substitute area. The choice of how much area to allocate for substitute area is a factor of the composition of the discard tolerances permitted by manufacture and related considerations. However, it may be possible that areas 505 and 507 outside of recording area 401 be used as the substitute or even an area defined within recording area 501B. Area 505 is defined near the center of optical disc 11. Area 507 is defined at the periphery of optical disc 11. Data may be recorded under any method in these areas including substitute area 503 but preferably will be recorded in accordance with the present invention, that is, the CLD method for an area within or adjacent to area 501a or the CAV method for an area within or adjacent to 501B.

Other objects, features and advantages of the present invention will become apparent from the above detailed description. It should be understood, however, that the detailed description and specific examples, while indicating preferred embodiments of the invention, are given by way of illustrations only, since various changes and modifications within the spirit and scope of the invention will become apparent to those skilled in the art.

What is claimed is:

1. An optical memory device for recording information to an optical memory having first and second radii defined from a center thereof, the optical memory device recording information in response to light irradiated thereon, said device comprising:

motor means for rotating the optical memory at a predetermined constant speed;

head means for recording information on the optical memory;

position detecting means for detecting a radial position of said head means facing the optical memory;

control means for controlling said head means to record information at a predetermined constant spacing when the radial position of said head means detected by said position detecting means is between a first and second predetermined radius from the center of the optical memory and to record information at a spacing which increases with increasing radius as the position of said head means detected by said position detecting means is further from the center of the optical memory when the radial position of said head means detected by said position detecting means is greater than the second predetermined radius from the center of the optical memory;

defect detecting means for detecting a defective memory portion on the optical memory; and substitute means for recording information to be recorded on the defective memory portion detected by said defect detecting means in a predetermined substitute recording area of the optical memory.

2. The device of claim 1, wherein said head means includes:

clock means for generating clock signals with a plurality of frequencies; and recording means, in response to the clock signal, for recording information.

3. The device of claim 2, wherein said clock means generates clock signals with frequencies selected such that the frequencies are varied linearly in regard to radius from the center of the optical memory between the first and second predetermined radii.

4. The device of claim 2, wherein said clock means generates clock signals with frequencies selected such that the frequencies are constant in regard to the position of said head means in an area outside the second predetermined radius from the center of the optical memory.

5. The device of claim 2, wherein the clock signals are generated at frequencies corresponding to each track of the optical memory, the track being a unit of recording on the optical memory.

6. The device of claim 5, wherein one frequency is assigned to one track of the optical memory and one frequency of one track is different from that of an adjacent track.

7. The device of claim 6, further comprising a reproducing means for reproducing information recorded by said head means and wherein the difference of frequency is within a predetermined range of values at which said reproducing means may reproduce information.

8. The device of claim 1, wherein said optical memory includes an optical disc that is round and the second predetermined radius is three quarters of the radius of the optical disc.

9. An optical memory for storing information, in response to light from a head device irradiating said optical memory, by a pit having different optical characteristics from a portion without information on said optical memory, the optical memory having first and second predetermined radii defined from a center thereof and said second predetermined radius being greater than said first predetermined radius, said optical memory comprising:

a first recording area, located between the first predetermined radius and the second predetermined radius on said optical memory, for storing information such that a spacing between adjacent pits is constant;

a second recording area, located outside the second predetermined radius, for storing information such that the spacing between adjacent pits increases with increasing radial position as the position at which the pit is made is further removed from the center of said optical memory; and a predetermined substitute area for storing information corresponding to a defective memory portion located in said first or second recording areas.

10. The memory of claim 9, wherein said optical memory includes an optical disc that is round and the second predetermined radius is three quarters of the radius of said optical disc.

11. The memory of claim 9, wherein the predetermined substitute area is allocated within the first recording area.

12. A method of recording information to an optical memory which records information in response to light emitted from a head means for recording information on the optical memory which is rotated at a predetermined constant speed during the recording operation, the recording method comprising the steps of:

detecting a radial position of the head means facing the optical memory;

controlling the head means to record information in a first format when the radial position of the head means detected by said detecting step is in a first inner area on the optical memory and recording information in a second format when the radial position of the head means detected by said detecting step is in a second outer area on the optical memory;

detecting a defective memory portion on the optical memory; and recording information to be recorded in the defective memory portion detected by said defect detecting step on the optical memory in a substitute area on the optical memory.

13. The method of claim 12, wherein said controlling step includes the steps of:

generating clock signals with a plurality of frequencies; and recording information in response to the clock signals generated by said clock signal generating step.

14. The method of claim 12, wherein said clock generating step includes the step of generating clock signals with frequencies so that the frequencies are linearly increase with increasing radial position of the head means from a center of the optical memory in the first inner area.

15. The method of claim 12, wherein said controlling step includes the step of generating clock signals and controlling said head means in response thereto, said clock signals having frequencies selected such that said frequencies are constant in the second outer area.

16. The method of claim 12, wherein said controlling step includes the step of generating clock signals and controlling said head means in response thereto, said clock generating step including the step of generating clock signals with frequencies selected such that one frequency is assigned to one track of the optical memory and the frequency for one track is different from that for an adjacent track in the first inner area.

17. A method of recording information to and reproducing information from an optical memory, the optical memory recording information in response to light emitted from a head means facing the optical memory for recording information on the optical memory, the optical memory being rotated at a predetermined constant speed during the recording operation, the method comprising the steps of:

detecting the radial position of the head means facing the optical memory;

controlling the head means to record information in a first format when the radial position of the head means detected by said detecting step is in a first inner area on the optical memory and recording information in a second format when the radial position of the head means detected by said detecting step is in a second outer area on the optical memory, wherein the step of controlling said head means includes the step of generating clock signals and controlling said head means in response thereto, detecting a defective memory portion on the optical memory; and recording information to be recorded in the defective memory portion detected by said defect detecting step on the optical memory in a substitute area on the optical memory;

subsequently reproducing information recorded on said optical memory wherein the differences in frequency of the clock signals generated by said clock generating step are within a predetermined range of values at which information may be reproduced by said reproducing step.

18. An apparatus for recording information on an optical memory having first and second predetermined radii defined from a center of the optical memory, the second predetermined radius being greater than the first predetermined radius, said apparatus comprising:

motor means for rotating the optical memory at a predetermined constant speed;

head means facing said optical memory for recording information on the optical memory rotated at said predetermined constant speed by said motor means;

position detecting means for detecting a radial position of said head means facing the optical memory;

first head control means for controlling said head means such that a spacing between adjacent pits is constant;

second head control means for controlling said head means such that the spacing between adjacent pits increases with increasing radial position as the position at which the pits are made is further removed from the center of the optical memory;

defect detecting means for detecting a defective memory portion on the optical memory;

substitute means for recording information to be recorded on the defective memory portion detected by said defect detecting means in a predetermined substitute recording area on the optical memory; and means responsive to the position detecting means for selecting said first or second head control means such that said head means records information in response to said first head control means when the radial position of said head means as detected by said position detecting means is between said first and second predetermined radii, and said head means records information in response to said second head control means when the radial position of said head means as detected by said position detecting means is greater than said second predetermined radius from the center of the optical memory.

19. A method for recording information on an optical memory, the optical memory recording information in response to light emitted from head means for recording information on the optical memory, the optical memory further being rotated at a predetermined constant speed during the recording process, said head means being selectively controlled by one of two control means, the first control means controlling said head means to record information in a first format in which a spacing between adjacent pits is constant, and a second control means controlling said head means to record information in a second format in which the spacing between adjacent pits increases with increasing radial position as the position of said head means is further removed from the center of the optical memory, the recording method comprising the steps of:

detecting the radial position of the head means facing the optical memory;

controlling the head means to record information in a first format when the radial position of the head means detected by said detecting step is in a first area on the optical memory and recording information in a second format when the radial position of the head means detected by said detecting step is in a second area on the optical memory, said second area being located outside the first area on the optical memory;

detecting a defective memory portion on the optical memory; and recording information to be recorded in the defective memory portion detected by said defect detecting step on the optical memory in a substitute area on the optical memory.

20. The optical memory device of claim 1 wherein said substitute area is located within said first predetermined radius.

21. The optical memory device of claim 1 wherein said substitute area is located between said first and second predetermined radii.

22. The optical memory device of claim 1 where said substitute area is located partially within said first predetermined radius and partially between said first and second predetermined radii.

* * * * *